(12) United States Patent
Hausberger et al.

(10) Patent No.: US 8,794,476 B2
(45) Date of Patent: Aug. 5, 2014

(54) OUTER TANK FOR CRYOGENIC FUEL

(75) Inventors: Klaus Hausberger, Graz (AT); Marius Meinert, Osnabrück (DE); Christian Döller, Graz (AT); Bernd Rauchegger, Köflach (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 1280 days.

(21) Appl. No.: 12/089,398

(22) PCT Filed: Oct. 9, 2006

(86) PCT No.: PCT/AT2006/000409
§ 371 (c)(1),
(2), (4) Date: Nov. 19, 2008

(87) PCT Pub. No.: WO2007/041733
PCT Pub. Date: Apr. 19, 2007

(65) Prior Publication Data
US 2009/0218353 A1 Sep. 3, 2009

(30) Foreign Application Priority Data
Oct. 7, 2005 (AT) .............................. GM 680/2005

(51) Int. Cl.
*F17C 1/00* (2006.01)
*F17C 1/04* (2006.01)
*F17C 1/02* (2006.01)

(52) U.S. Cl.
CPC ... *F17C 1/04* (2013.01); *F17C 1/02* (2013.01); *F17C 2203/011* (2013.01)
USPC ................... 220/560.11; 220/560.1; 220/647; 220/729

(58) Field of Classification Search
USPC ............ 220/560.11, 560.04, 560.05, 560.06, 220/560.07, 560.08, 560.09, 560.1, 560.12, 220/560.14, 560.15; 62/45.1, 54.3; 280/830, 839
See application file for complete search history.

(56) References Cited

U.S. PATENT DOCUMENTS

| | | | | |
|---|---|---|---|---|
| 2,556,470 A | * | 6/1951 | Del Mar | 428/118 |
| 2,648,848 A | * | 8/1953 | Wirkus | 4/416 |
| 3,007,596 A | * | 11/1961 | Matsch | 220/560.13 |
| 3,018,016 A | * | 1/1962 | Huilicka, Jr. | 220/560.13 |
| 3,306,059 A | | 2/1967 | Stelts et al. | |
| 3,312,076 A | * | 4/1967 | Clarke et al. | 62/45.1 |
| 3,325,037 A | * | 6/1967 | Kohn et al. | 220/560.11 |
| 3,341,050 A | * | 9/1967 | Forman et al. | 220/560.12 |
| 3,359,745 A | * | 12/1967 | Basile et al. | 62/45.1 |
| 3,613,932 A | * | 10/1971 | Yamamoto | 220/560.07 |

(Continued)

FOREIGN PATENT DOCUMENTS

| FR | 1162473 | 9/1958 |
|---|---|---|
| FR | 2776750 | 10/1999 |
| JP | 2004225772 | 8/2004 |

*Primary Examiner* — Robert J Hicks
*Assistant Examiner* — Kareen Rush
(74) *Attorney, Agent, or Firm* — Bachman & LaPointe, P.C.

(57) ABSTRACT

A motor vehicle outer tank for a cryogenic fuel which is situated in an inner tank which is positioned within the outer tank is, for space and weight-saving purposes, characterized in that it is of flat design, and is designed in particular as a parallelepiped, and in that planar side walls of the outer tank are at least partially of sandwich design or are reinforced with sandwich plates.

31 Claims, 4 Drawing Sheets

(56) References Cited

U.S. PATENT DOCUMENTS

| | | | |
|---|---|---|---|
| 4,509,657 A * | 4/1985 | Grondalen | 220/560.09 |
| 6,347,719 B1 | 2/2002 | Rosen et al. | |
| 7,775,391 B2 * | 8/2010 | Harper | 220/560.1 |
| 2002/0088806 A1 | 7/2002 | Takaku et al. | |
| 2005/0025929 A1 * | 2/2005 | Smith et al. | 428/73 |
| 2006/0131304 A1 * | 6/2006 | Yang et al. | 220/4.16 |

* cited by examiner

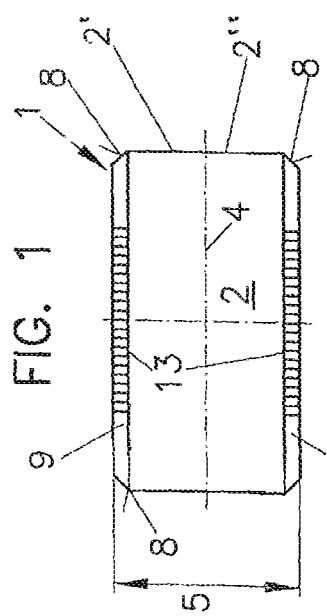
FIG. 1
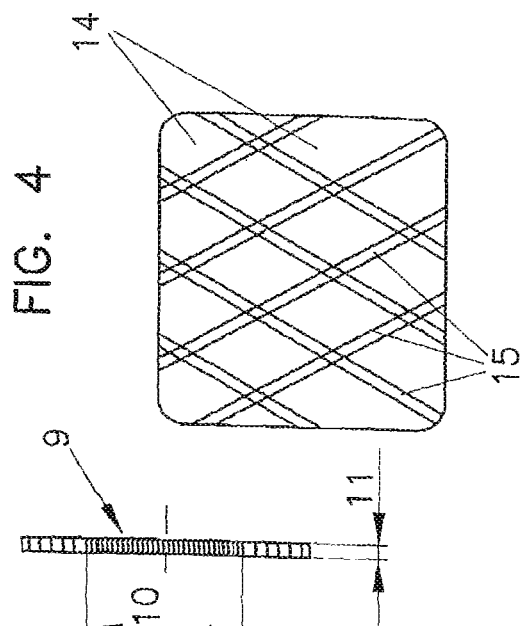
FIG. 3
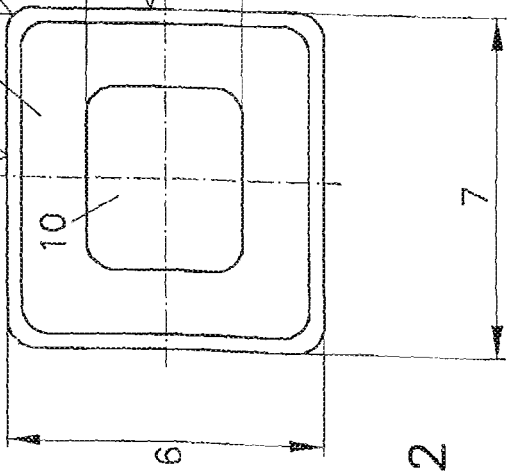
FIG. 2
FIG. 4

OUTER TANK FOR CRYOGENIC FUEL

BACKGROUND OF THE INVENTION

The invention relates to a motor vehicle outer tank for a cryogenic fuel which is situated in an inner tank which is positioned within the outer tank.

An outer tank for a known cryogenic fuel is known for example from U.S. Pat. No. 6,347,719 B1. Said known outer tank is of a lightweight design for stratospheric missiles. Said outer tank is of spherical design and is formed by a sandwich wall. Provided spaced apart from said sandwich wall is a likewise spherical wall, composed of metal, as an inner tank. The inner wall and the sandwich outer wall are connected to one another by means of welding, specifically at two opposite meridians of the container, which results in a composite design, that is to say the outer tank is not self-supporting. An outer tank of said type is voluminous as a result of its spherical design and can be installed in a motor vehicle only with difficulty and with a large loss in useful space. A further disadvantage of said known outer tank is to be considered that of production being complex, especially since the outer and inner tanks can only be produced together, and the individual parts are highly fragile before being joined together.

DE 101 63 029 A1 discloses a high-pressure hydrogen tank in which an inner polyethylene lining is surrounded by an outer winding which is intended to prevent a bulging effect. The inner side of the lining is also provided with a hydrogen barrier layer. A tank of said type likewise entails space problems, in particular in motor vehicle construction.

Conventional reinforcement measures for buckling-critical containers with large surfaces are usually very massive; thick sheet metal wall thicknesses result in both complex production techniques and also joining techniques as a result of the use of a large number of web sheets or bulkhead sheets in cryogenic inner tanks, and the ultimate result is a high weight. Said inner tank reinforcement measures, in order to counteract the buckling of the outer tank caused by the atmospheric pressure, with welded-in web sheets can never be used for cryogenic outer tank containers because this does not permit the inner tank mounting and because more layers for inner tank insulation must be positioned between the inner and outer tanks and there is therefore no space for inner reinforcements of said type. In addition, there may be no heat bridges between the outer tank and the inner tank.

SUMMARY OF THE INVENTION

The invention is based on the object of creating an outer tank, preferably a self-supporting outer tank, for a cryogenic fuel for use for a motor vehicle, in particular for compact motor vehicles such as passenger cars, which is easy to accommodate even in the event of restricted spatial conditions in the motor vehicle. A further essential aspect is to be considered that of it being possible for the outer tank to be produced in a simple manner, for example even to be assembled (welded) in an automated process by means of robots. The outer tank should also have only a low weight.

Said object is achieved according to the invention in that the outer tank is of flat design, and is designed in particular as a parallelepiped, and in that planar side walls of the outer tank are at least partially of sandwich design or are reinforced with sandwich plates.

According to a first embodiment, a sandwich plate which is provided with an upper belt and a lower belt is mounted on, in particular adhesively bonded to, a planar side wall of the outer tank.

A further embodiment is characterized in that a sandwich plate with an upper belt but without a lower belt is adhesively bonded to a planar side wall of the outer tank, with the side wall of the outer tank serving as a lower belt and being part of the sandwich plate.

A significant increase in the container strength can be obtained if at least the upper belt of the sandwich plate, preferably the upper belt and the lower belt thereof, is connected with its edge to the side wall of the outer tank by means of a weld seam.

If the side walls of the outer tank are produced in a deformation process, in particular in a cold working process such as in a deep-drawing process, the sandwich plate preferably projects up to a hardened, in particular work-hardened edge region of a side wall and is welded to said edge region there.

Particularly good space utilization is obtained by means of an outer tank in which a side wall is provided in the peripheral region with an outwardly aligned edge bead or arched portion and the sandwich plate extends at least up to said edge bead and is welded there at least with its upper belt to the side wall of the outer tank, with the upper belt of the sandwich plate preferably lying in a plane with the edge bead, that is to say the highest region of the latter. Said edge bead can particularly advantageously serve to hold tube lines which are situated between the outer and inner tank, without it being necessary for the height of the tank to be increased as a result.

According to one preferred embodiment, the sandwich plate extends up to a side panel, such as a body panel, which is adjacent to the outer tank, and said sandwich plate is fixedly connected, such as for example screwed, to said side panel, as a result of which the outer tank also contributes to the stiffening of the adjoining body panel.

As an additional measure for preventing the sandwich plate from peeling off a side wall of the outer tank, T-bolts are fastened to that side wall of the outer tank which is reinforced with the sandwich plate, which T-bolts extend perpendicular to the side wall and extend through the sandwich plate, and the sandwich plate is secured on the outer tank by means of a screw connection on the T-bolt.

In order to reduce warping as a result of welding to the greatest possible extent, the weld seam of the connection of the sandwich plate to the outer tank is formed as a stepped weld seam.

In practice, it has been found that an outer tank according to the invention withstands the outer pressure most effectively within one dimensional range. The outer tank therefore expediently has a height of between 100 and 500 mm, preferably between 200 and 350 mm, and a length or width of between 500 and 1400 mm, preferably between 700 and 1000 mm.

The thickness of the sandwich plate is preferably between 5 and 20 mm.

An embodiment which is optimally adapted to the torque profile is characterized in that the sandwich plate has a central region with a support core, in particular a honeycomb core, which is compressed in relation to the edge region.

In order to avoid a stiffness jump at the peripheral edge of the sandwich plate, the sandwich plate, in its peripheral edge region, decreases in height to the peripheral edge, and preferably no support core is provided in said peripheral region.

In order to ensure correct adhesive bonding of the sandwich plate to a side wall of the outer tank, the area of contact of the sandwich plate with the side wall of the outer tank has ventilation ducts for promoting adhesive curing and degassing, which ventilation ducts are formed by ducts in the adhesive layer and/or by ribs on the side wall of the outer tank and/or by holes in the sandwich plate.

The sandwich plate is preferably guided up to an auxiliary system capsule, which is arranged adjacent to the outer tank, for tank accessories (valves etc.), and is fixedly connected, such as for example screwed, to the auxiliary system capsule, as a result of which the auxiliary system capsule contributes to the stiffening of the outer tank.

In order to save weight, both the side wall of the outer tank and also the upper and lower belt of the sandwich plate are expediently formed from aluminum or an aluminum alloy, with the support core preferably also being formed from aluminum or an aluminum alloy.

The edge and narrow side regions of the outer tank preferably have no sandwich reinforcement.

BRIEF DESCRIPTION OF THE DRAWINGS

The invention is explained in more detail below on the basis of a plurality of exemplary embodiments which are schematically illustrated in the drawing.

FIG. 1 shows a side view of an outer tank,

FIG. 2 shows a plan view and

FIG. 3 shows a section through a sandwich plate as is used for the outer tank according to the invention.

FIG. 4 shows the view of an area of adhesive between a side wall of the outer tank and a sandwich plate.

DETAILED DESCRIPTION

Figure 5:
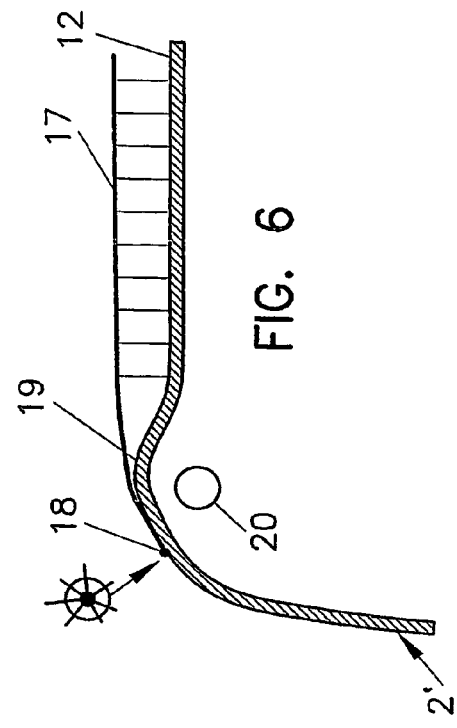
FIGS. 5 to 8 show different variants of the design of the peripheral edge region of a sandwich plate and its connection to a side wall of the outer tank in cross section.

The tank 1, illustrated in FIGS. 1 and 2, for a motor vehicle serves to store a cryogenic fuel. Said tank is formed from an outer tank 2 and an inner tank 3 which has no direct connection to the outer tank 2 in order to avoid heat bridges, which inner tank 3 serves to hold the cryogenic fuel.

The outer tank 2 is of self-supporting design and is formed from two tank halves 2', 2", which tank halves 2', 2", for weight reasons, are preferably generated from aluminum sheet, that is to say blanks which are deep-drawn or which are shaped by some other process from a sheet composed of an aluminum alloy, and which tank halves 2', 2" are connected to one another by means of a weld seam 4. The outer tank 2 has the shape of a cuboid. The height 5 is between 100 and 500 mm, preferably between 200 and 350 mm, the width 6 and length 7 are between 500 and 1400 mm, preferably between 700 and 1000 mm. Work hardening occurs at the rounded edge regions 8 as a result of the deep-drawing process.

Adhesively bonded to the upper and lower sides of said outer tank 2, that is to say to the largest side walls 13 of the outer tank 2, is in each case one sandwich plate 9, preferably formed as an aluminum honeycomb sandwich plate. In a honeycomb sandwich plate, the air which is enclosed by the honeycombs has a heat insulating effect, which improves the flame resistance. As indicated schematically in FIG. 3, said sandwich plate 9 has a compressed honeycomb arrangement in the center or in the central region 10 in order to better withstand the buckling loading, which acts to an increased degree in the central region 10, as a result of the air pressure. In this way, it is possible to minimize the thickness 11 of the sandwich plate 9.

Each sandwich plate 9 is adhesively bonded with its lower belt 12 directly to the side wall 13 of the outer tank 2 by means of an adhesive layer 14. A two-component adhesive with a high level of shear resistance and peeling resistance has proven to be effective as an adhesive. It is also possible to use adhesive films, since it is likewise possible to obtain high peeling forces with these. In order to ensure correct adhesive curing and in order to discharge the gases which are thereby generated out of the adhesive layer 14, the latter is provided with ventilation ducts 15. Ducts 15 of said type could also be formed by holes in the sandwich plate 9 or by means of rib-like elevations on the side wall 13 of the outer tank.

As can be seen from FIG. 5, the peripheral edge region 16 of the sandwich plate 9 is of wedge-shaped design, that is to say the upper belt 17 is guided to the lower belt 12, with no honeycombs being provided in said tapering region, so that an excessively large stiffness jump at the transition from the sandwich plate 9 to the side wall 13, that is to say the edge region 8 thereof, is prevented or reduced. The sandwich plate 9 preferably has an upper and a lower belt 17, 12 composed of aluminum, preferably of an aluminum alloy.

Both the upper belt 17 and also the lower belt 12 are welded to the outer tank 2 in the edge region 8 of the side wall 13 of the outer tank 2, with the weld seam 18 either running continuously or being formed as an interrupted weld seam in order to reduce the risk of warping.

Figure 6:
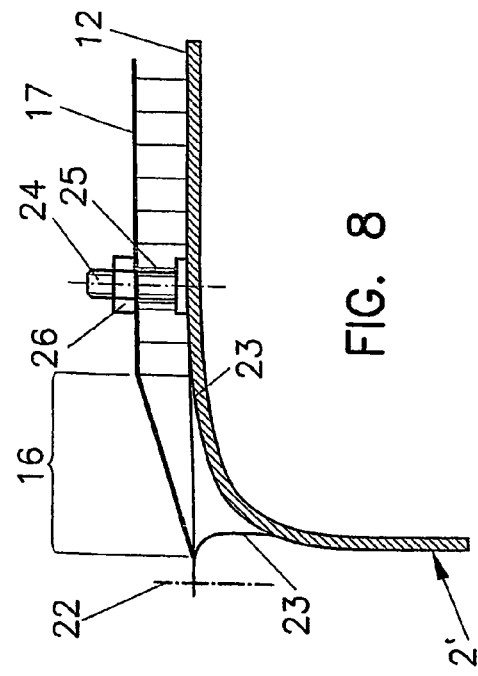
Figure 9:
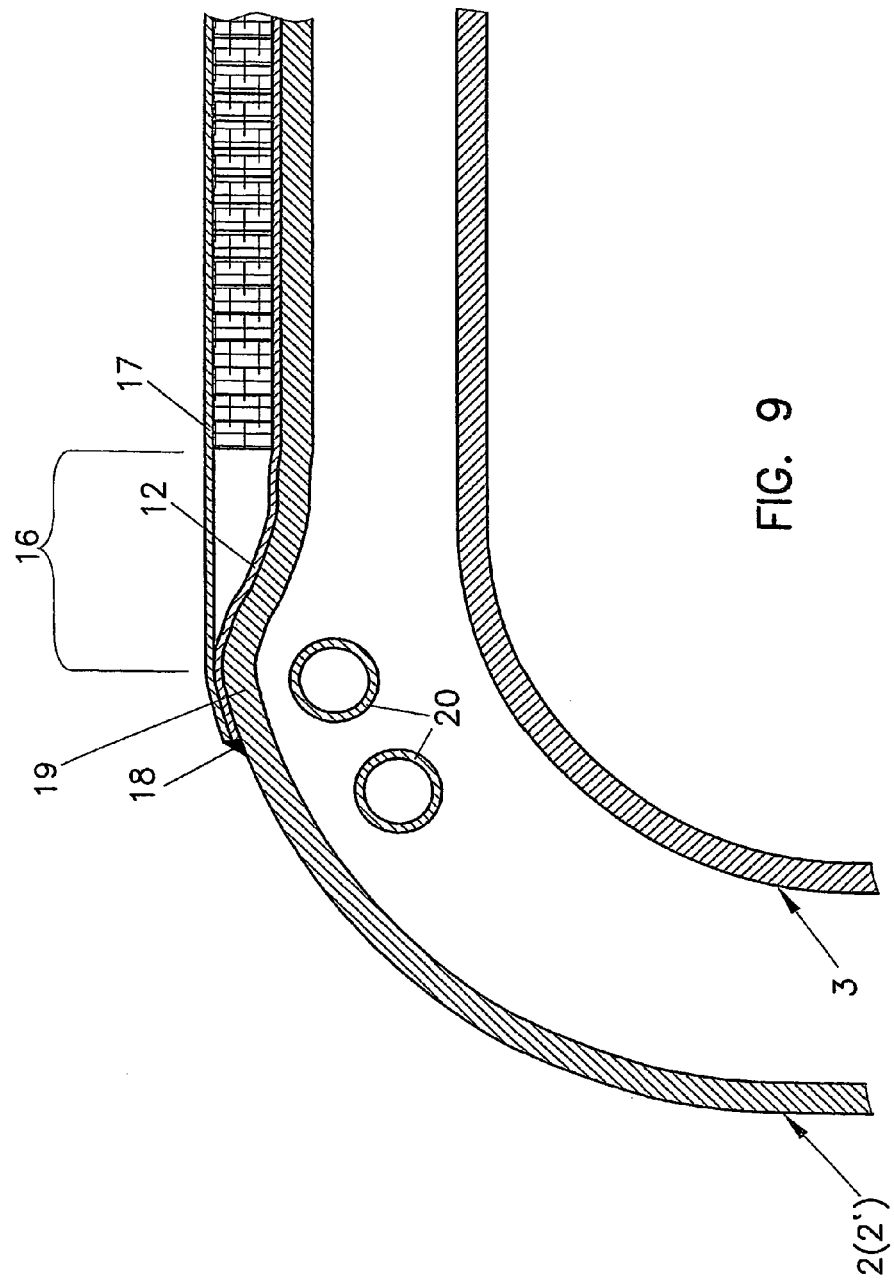
FIG. 9 shows in detail the embodiment illustrated in FIG. 6.

One particularly preferred embodiment is shown in FIG. 6 and in detail in FIG. 9. According to said variant, the side wall 13 of the outer tank 2 has an outwardly aligned edge bead 19 or arched portion. Here, too, the lower belt 12 and the upper belt 17 of the sandwich plate 9 are welded to the side wall 13 of the outer tank 2, specifically in the work-hardened edge region 8. As a result of the edge bead 19, space for tubes 20 is created in the interior of the outer tank 2, that is to say between the outer tank 2 and the inner tank 3, which is designed as a vacuum space. The usable tank height 5 is not increased by means of said edge bead 19, especially because the edge bead 19, which extends around the periphery of the side wall 13, forms a depression in the side wall 13 which serves for holding the sandwich plate 9. Here, too, the edge region 16 of the sandwich plate 9 is formed without honeycombs, so that a stiffness jump in the edge zone is prevented or reduced.

A further advantage of the edge bead 19 is that it serves to generate better shape and dimensional stability of the two deep-drawn parts 2', 2" of the outer tank 2.

Figure 7:
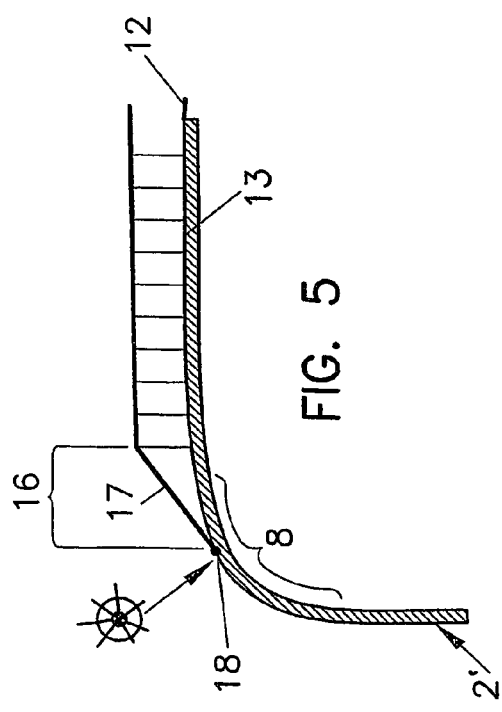

According to the embodiment illustrated in FIG. 7, an auxiliary system capsule 21 which holds tank assemblies, such as valves, for the tank 1, and which itself is formed as an inherently rigid housing and is provided adjacent to the outer tank 2, is connected to the end region of the sandwich plate 9, for example by means of a screw connection 22, as a result of which the auxiliary system capsule 21 also contributes to the stiffening of the outer tank 2.

Figure 8:
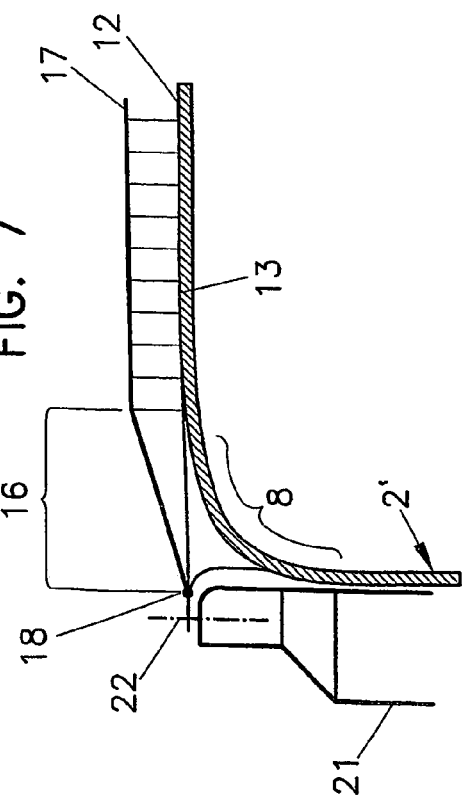

In the variant illustrated in FIG. 8, the outer tank 2 is provided as reinforcement to a body region, with a body panel 23 being connected to that edge region of the sandwich plate 9 which projects beyond the edge region 8 of the outer tank 2, for example by means of a screw connection 22.

FIG. 8 shows a T-bolt 24 which is fastened to the side wall 13 of the outer tank 2 and which projects through a recess 25 of the sandwich plate 9. The sandwich plate 9 is fastened to the side wall 13 of the outer tank 2 by means of a nut 26 plus washer which is screwed onto the T-bolt 24, so that peeling of the sandwich plate 9 from the side wall 13 and, as a result, buckling of the side wall 13 is reliably prevented.

Figure 10:
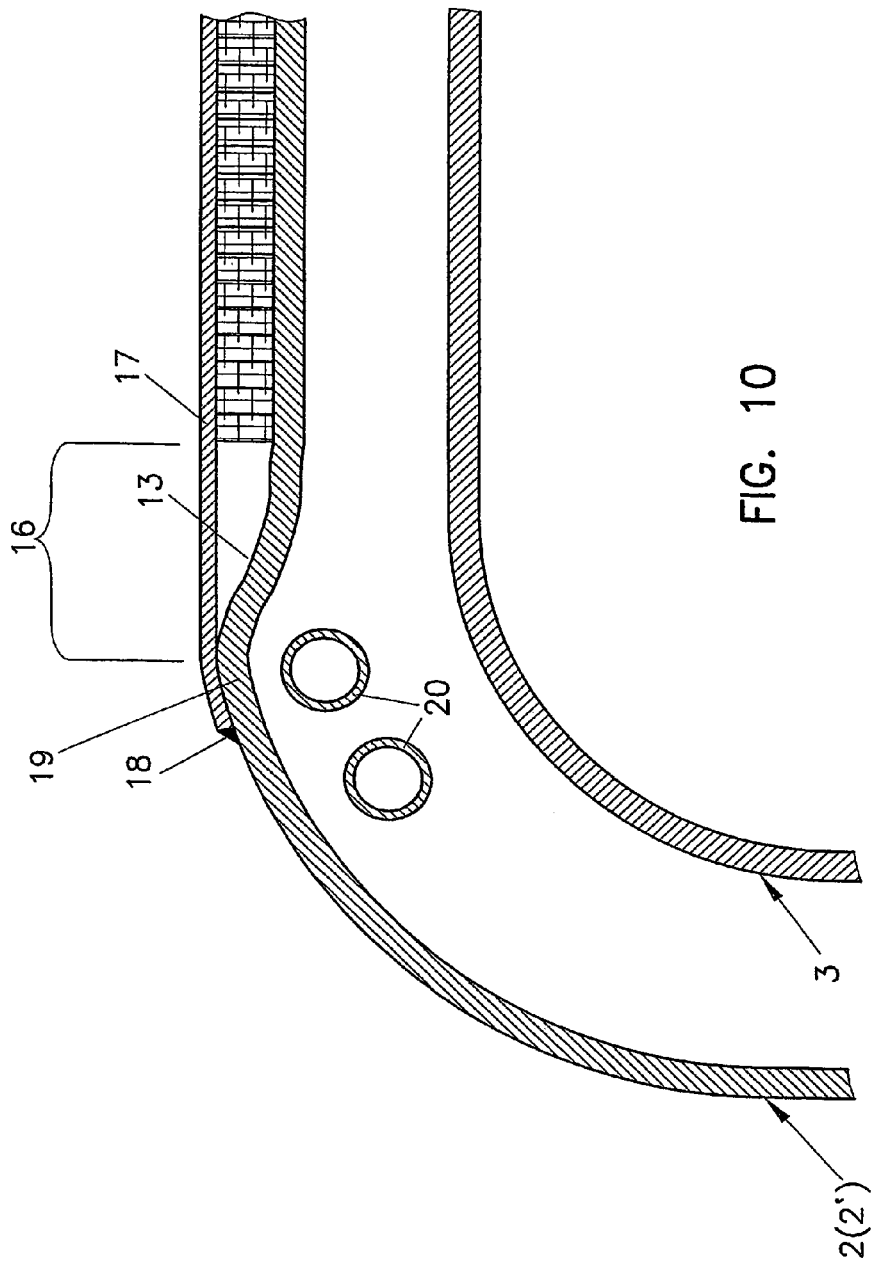
FIG. 10 shows a further variant in a similar illustration to FIG. 9.

FIG. 10 shows a variant in which the sandwich plate 9 has only an upper belt 17. In this case, the honeycombs are adhesively bonded directly, that is to say without a lower belt 12, to the side wall 13, as a result of which it is possible to compensate production inaccuracies of the side wall 13 of the outer tank 2, such as for example instances of unevenness generated by the deep-drawing process etc. In this case, the side wall 13 itself forms the lower belt, so that the side wall 13 is integrated into the sandwich plate 9, that is to say can itself be considered as the sandwich plate. It can be seen that, both in the variant as per FIG. 9 and in the variant as per FIG. 10, the upper belt 17 adjoins the edge bead 19 in a substantially planar manner.

A further advantage of the variant illustrated in FIG. 10 is that the degassing can take place via the honeycombs, which are provided with small holes. Furthermore, the weight-specific bending resistance moment is greater, since the height of the honeycombs can be dimensioned to be larger by the thickness of the lower belt 17. This also results—since the lower belt is omitted—in a weight saving. The production of the weld seam 18 only between the upper belt 17 and the edge region 8 of the outer tank 2 is also easier than when two sheets, specifically the upper and lower belts of the sandwich plate 9, must be simultaneously welded to the edge region 18.

The application of the adhesive to the side walls 13 which are to be reinforced and also the handling and the pressing of the tailored sandwich plates 9 onto the provided buckling-critical faces of the side wall 13 takes place in the same way as an adhesive application in series body manufacture, specifically fully automatically by means of robots or with an adhesive film. It is likewise possible for the welding of the sandwich plate 9 to the side wall 13 of the outer tank 2 to be carried out by means of robots.

The invention is not restricted to the exemplary embodiments illustrated in the drawing, but rather can be modified in various ways and nevertheless achieve the object on which the invention is based. For example, the outer tank can also have a cylindrical shape but with a much smaller height than diameter, with the circular faces being fitted with a sandwich plate or, as shown in FIG. 10, being formed as sandwich plates. This likewise results in a flat design.

The invention claimed is:

1. Motor vehicle outer tank for a cryogenic fuel, wherein the cryogenic fuel is situated in an inner tank which is positioned within the outer tank, wherein the outer tank is of flat design having planar side walls and end walls connecting the planar side walls to define a closed outer tank having a closed inner space, and wherein material of the outer tank extends continuously from the end walls to the planar side walls, and further comprising at least one sandwich plate mounted on and overlapping at least one of the planar side walls.

2. Outer tank according to claim 1, wherein the sandwich plate has an upper belt and a lower belt and is mounted on the planar side wall of the outer tank.

3. Outer tank according to claim 1, wherein the sandwich plate has an upper belt and no lower belt and is adhesively bonded to a planar side wall of the outer tank.

4. Outer tank according to claim 1, wherein at least an upper belt of the sandwich plate is connected with its edge to the side wall of the outer tank by means of a weld seam.

5. Outer tank according to claim 1, wherein the side walls of the outer tank are produced in a deformation process and the sandwich plate projects up to a hardened edge region of a side wall and is welded to the latter there.

6. Outer tank according to claim 1, wherein a side wall is provided in the peripheral region with an outwardly aligned edge bead or arched portion and the sandwich plate extends at least up to said edge bead and is welded there at least with its upper belt to the side wall of the outer tank, with the upper belt of the sandwich plate lying in a plane with a highest region of the edge bead.

7. Outer tank according to claim 1, wherein the sandwich plate extends up to a side panel which is adjacent to the outer tank, and said sandwich plate is fixedly connected to said side panel.

8. Outer tank according to claim 1, wherein T-bolts are fastened to that side wall of the outer tank which is reinforced with the sandwich plate, which T-bolts extend perpendicular to the side wall and extend through the sandwich plate, and wherein the sandwich plate is secured on the outer tank by means of a screw connection on the T-bolt.

9. Outer tank according to claim 4, wherein the weld seam of the connection of the sandwich plate to the outer tank is formed as a stepped weld seam.

10. Outer tank according to claim 1, wherein the outer tank has a height of between 100 and 500 mm.

11. Outer tank according to claim 1, wherein the sandwich plate has a thickness of between 5 and 20 mm.

12. Outer tank according to claim 1, wherein the sandwich plate has a central region with a support core which is compressed in relation to an edge region.

13. Outer tank according to claim 1, wherein the sandwich plate, in its peripheral edge region, decreases in height to the peripheral edge, and no support core is provided in said peripheral region.

14. Outer tank according to claim 1, wherein the area of contact of the sandwich plate with the side wall of the outer tank has ventilation ducts for promoting adhesive curing and degassing, which ventilation ducts are formed by ducts in the adhesive layer and/or by ribs on the side wall of the outer tank and/or by holes in the sandwich plate.

15. Outer tank according to claim 1, wherein the sandwich plate is guided up to an auxiliary system capsule, which is arranged adjacent to the outer tank, for tank accessories, and is fixedly connected to the auxiliary system capsule.

16. Outer tank according to claim 1, wherein both the side wall of the outer tank and also the upper and lower belt of the sandwich plate are formed from aluminum or an aluminum alloy.

17. Outer tank according to claim 1, wherein the edge and narrow-side regions of the outer tank do not have any sandwich reinforcement.

18. Tank having an outer tank according to claim 1, wherein the outer tank is self-supporting and the inner tank is not loaded by air pressure forces which act on the outer tank.

19. Outer tank according to claim 1, wherein the outer tank is shaped as a parallelepiped.

20. Outer tank according to claim 1, wherein the sandwich plate is adhesively bonded to the planar side wall of the outer tank.

21. Outer tank according to claim 1, wherein an upper belt and lower belt of the sandwich plate are connected to the side wall of the outer tank by means of a weld seam.

22. Outer tank according to claim 1, wherein the side walls of the outer tank are produced in a cold working process.

23. Outer tank according to claim 1, wherein the side walls of the outer tank are produced in a deep-drawing process.

24. Outer tank according to claim 1, wherein the sandwich plate projects up to a work-hardened edge region.

25. Outer tank according to claim 1, wherein the sandwich plate extends up to a body panel which is adjacent to the outer tank.

26. Outer tank according to claim 7, wherein the sandwich plate is fixedly connected by screws to said side panel.

27. Outer tank according to claim 1, wherein the outer tank has a height of between 250 and 350 mm and a length of between 700 and 1000 mm.

28. Outer tank according to claim 1, wherein the sandwich plate has a central region with a honeycomb core.

29. Outer tank according to claim 1, wherein the sandwich plate is mounted to at least one of the planar side walls of the closed outer tank, and wherein the closed outer tank defines the closed inner space independent of the sandwich plate.

30. Outer tank according to claim 1, wherein the flat design of the outer tank defines large upper and lower side walls of the outer tank, and wherein the sandwich plate is mounted to and overlaps at least one of the large upper and lower side walls.

31. Motor vehicle outer tank for a cryogenic fuel, wherein the cryogenic fuel is situated in an inner tank which is positioned within the outer tank, wherein the outer tank is of flat design having planar side walls, and further comprising at least one sandwich plate mounted on at least one of the planar side walls, wherein the outer tank is a closed outer tank and defines a closed inner space independent of the sandwich plate, and wherein the sandwich plate has an upper belt and a lower belt and is mounted on and overlaps the planar side wall of the closed outer tank.

\* \* \* \* \*